US008252425B2

(12) United States Patent
Lee et al.

(10) Patent No.: US 8,252,425 B2
(45) Date of Patent: Aug. 28, 2012

(54) ACRYLIC EMULSION PRESSURE SENSITIVE ADHESIVE COMPOSITION

(75) Inventors: Kang I. Lee, Dublin, OH (US); Keith D. King, Columbus, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 12/001,518

(22) Filed: Dec. 12, 2007

(65) Prior Publication Data

US 2009/0156731 A1    Jun. 18, 2009

(51) Int. Cl.
*B32B 27/30* (2006.01)
*C08K 5/41* (2006.01)
*C08F 220/18* (2006.01)

(52) U.S. Cl. ........ 428/522; 524/745; 524/747; 524/829; 524/820; 524/832; 526/307.6; 526/318.4; 526/318.45

(58) Field of Classification Search .......... 524/156, 524/745, 747, 829, 820, 832; 428/522; 526/307.6, 526/318.4, 318.45
See application file for complete search history.

(56) References Cited

U.S. PATENT DOCUMENTS

| | | | | |
|---|---|---|---|---|
| 3,970,628 A | * | 7/1976 | Connelly et al. | 523/411 |
| 4,623,695 A | * | 11/1986 | Hoefer et al. | 524/747 |
| 5,116,676 A | * | 5/1992 | Winslow | 428/343 |
| 5,416,134 A | * | 5/1995 | Skoglund | 523/201 |
| 6,013,722 A | * | 1/2000 | Yang et al. | 524/558 |
| 6,106,940 A | * | 8/2000 | Nielson et al. | 428/355 AC |
| 6,599,972 B2 | * | 7/2003 | Thames et al. | 524/398 |
| 6,864,322 B2 | * | 3/2005 | Gehlsen et al. | 525/227 |
| 6,878,763 B2 | * | 4/2005 | Blease et al. | 524/140 |
| 6,927,267 B1 | | 8/2005 | Varela de la Rosa et al. | |
| 2003/0000643 A1 | * | 1/2003 | Herlfterkamp et al. | 156/327 |
| 2005/0075425 A1 | * | 4/2005 | Bouvy et al. | 524/115 |
| 2006/0247367 A1 | * | 11/2006 | Guo et al. | 524/556 |

FOREIGN PATENT DOCUMENTS

| | | | | |
|---|---|---|---|---|
| JP | 58162670 A | * | 9/1983 | |
| JP | 61009402 A | * | 1/1986 | |
| JP | 2002265907 A | * | 9/2002 | |

OTHER PUBLICATIONS

Machine translated English equivalent of JP 2002265907 A, pp. 1-14.*
CAPlus Abstract of JP 2002265907 A (AN 2002:711064), 2 pages.*
Eleminol JS-2, Sanyo Chemical Product Outline, 6 pages.*
CA Plus Abstract of JP 61009402 A (AN 1986:628609), 1 page.*
JP Abstract of JP 58162670 A, 2 pages.*
CA Plus Abstract of JP 58162670 A (AN 1984:439923), 2 pages.*

* cited by examiner

*Primary Examiner* — Ling Choi
*Assistant Examiner* — Brieann R Fink
(74) *Attorney, Agent, or Firm* — Mark A. Montana

(57) ABSTRACT

An improved aqueous acrylic emulsion pressure sensitive adhesive composition of diminished foaming and being formulated from an aqueous acrylic emulsion including at least one carboxyl monomer having a residual carboxyl group, which residual carboxyl group is neutralized with a hydroxyl-functional amine, such as a trialkanolamine.

11 Claims, No Drawings

ACRYLIC EMULSION PRESSURE SENSITIVE ADHESIVE COMPOSITION

CROSS-REFERENCE TO RELATED APPLICATIONS

None

STATEMENT REGARDING FEDERALLY SPONSORED RESEARCH

Not applicable.

BACKGROUND

The present disclosure relates to pressure sensitive adhesives and more particularly to a water-based pressure sensitive adhesive ("PSA") suitable for high performance applications.

The manufacture of pressure sensitive adhesive tapes is being shifted from organic solvent systems to aqueous latices in order to reduce air pollution and fire hazard, as well as eliminate the rising expense of organic solvents. Pressure sensitive adhesives for high performance application must meet or exceed diverse, often seemingly incompatible, criteria. Initially, the adhesive must coat well on silicone or other release sheets. The adhesive also must exhibit tenacious adherence to film face stock which may serve a masking function or may convey information, e.g., by its imprinting.

When the adhesive coated film face stock is removed from the release sheet, the adhesive must exhibit initial tack and peel performance when pressure-applied to a substrate. The substrate bearing the adhesively-bound film face stock may be subjected to a variety of manufacturing operations over time. Thermal cycling of the substrate is a condition to which high performance, pressure sensitive adhesives must be designed to confront. When the film face stock is removed from the substrate, removal must be clean, i.e. no visible trace of the adhesive should remain on the substrate. Heat aging of the film face stock/substrate laminate, however, tends to cause the adhesive to "build", that is, the necessity to utilize excessive force to remove the film face stock. Thus, the adhesive should stick well initially, but not so well that its later removal is difficult. Then too, the adhesive must possess shelf life, viscosity, etc., making it compatible with existing coating and handling techniques utilized in the art.

More particularly, all emulsion polymers foam due to their surfactant content. Without the addition of defoaming/antifoaming agents, emulsion polymers would be difficult at best to process into useful form, such as, for example, forming a film on a substrate. Unfortunately, most defoamers lose their efficacy over time. Adding additional defoamer to the emulsion prior to application may be of limited value due to numerous side effects encountered. Furthermore, coating of the emulsion often requires high shear, which may be compromised by the late addition of additional defoamer.

It is to this problem that the present PSA composition is addressed.

BRIEF SUMMARY

An improved aqueous acrylic emulsion pressure sensitive adhesive composition of diminished foaming is formulated from an aqueous acrylic emulsion including at least one carboxyl monomer having a residual carboxyl group, which residual carboxyl group is neutralized with a hydroxyl-functional amine, such as a trialkanolamine.

Advantages of the present PSA composition include its diminished defoaming instability. Another advantage includes preservation of other PSA performance properties. These and other advantages will be readily apparent based upon the disclosure set forth herein.

DETAILED DESCRIPTION

The major ingredient in the emulsion copolymer(s) broadly is a $C_4$-$C_{18}$ alkyl (meth)acrylate monomer and advantageously a $C_4$-$C_{12}$ alkyl (meth)acrylate monomer. n-Butyl acrylate and 2-ethylhexyl acrylate are two monomers that have proven advantageous in forming the emulsion copolymer(s) of the present PSA composition, though other straight chain, alicyclic, and cyclic alkyl (meth)acrylate monomers may be used as is necessary, desirable, or convenient. By convention, the parentheticals used herein designate optional content, i.e., (meth)acrylate means "acrylate" or "methacrylate", and the same is true for the parenthetical plurals used herein. Also by convention, copolymer and interpolymer both mean a polymer of two or more monomers. The selection of the terms as used herein is for the clarity of understanding and not by way of limitation.

A combination of acrylamide (e.g., $C_4$-$C_{18}$ alkyl (meth)acrylamide monomers and advantageously a $C_4$-$C_{12}$ alkyl (meth)acrylamide monomers, diacetone acrylamide, and the like) and ethylenically unsaturated carboxylic acid form the balance of the emulsion copolymer(s) and their combination is important to the high performance properties realized. The proportion of acrylamide ranges from about 0.1 wt-% to about 5 wt-% while the proportion of unsaturated acid ranges from about 0.2 to about 10% by weight. For present purposes, the acrylamide content includes N-alkyl and other substituted acrylamides and polyamides, e.g., diamides. Cross-linking monomers, e.g., N-methylol acrylamides, may be present in minor amount (e.g., not more than about 15 wt-%), though such latent cross-linking functionality tends to lower tack and initial peel values, thus reducing the strength and suitability of the adhesive composition for some applications. N-methylol substituted acrylamides may be present in the formulation, but such components generate formaldehyde when the films are coated which is a health concern in the industry. Latent cross-linking functionality additionally can cause a loss of adhesive properties of aged unapplied films and labels. Additive cross-linkers cause problems in use with adhesive batch-to-batch consistency, pot life, reactivity, and variation in adhesive performance. Fortuitously, latent cross-linking functionality and additive cross-linkers are not required of the novel adhesive composition.

Suitable acrylamide or acrylamide derivatives, then, are one or more of acrylamide, diacetone acrylamide, N,N'-dimethacrylamide, N,N'-diethylmethacrylamide, n-tert-octylacrylamide, N-iso-propylacrylamide, N-(n-octyldecyl)acrylamide, N-benzylmethacrylamide; methacrylamide, N,N'-dimethylmethacrylamide, N,N'-diphenyl methacrylamide, N-n-dodecylmethacrylamide, or N-ethylmethacrylamide, N-[3-(N,N'-Dimethylamino)-propyl]acrylamide, N-[2-N,N'-dimethylamino-ethyl]methacrylamide N-[3-(N,N'-dimethylamino)-propyl]methacrylamide, N,N'-cystaminebisacrylamide, N,N'-ethylenebisacrylamide, N,N'-hexamethylenebisacrylamide, N,N'-methylenebisacrylamide hydroxymethydiacetoneacrylamide, N,N'-diallylacrylamide, N-methylolacrylamide, N-(phthalimidomethyl)acrylamide, N-(2-hydroxypropyl)methacrylamide, or N-(iso-butoxymethyl)methacrylamide.

While the preferred acid simply is acrylic acid, a variety of additional ethylenically unsaturated carboxylic acids may be useful in forming the emulsion copolymer. Additional acids include, for example, butenoic acids, e.g., crotonic acid, isocrotonic acid, and vinyl acetic acid; an acid from the fumaric acid series, e.g. fumaric acid, maleic acid, glutaconic acid, allyl malonic acid, and allyl succinic acid; and dicarboxylic acids, e.g., itaconic acid. Lower alkyl-substituted (e.g., $C_1$-$C_4$ alkyl group) acrylic acid, e.g., methacrylic acid, additionally can find use in formulating the emulsion copolymer(s) of the present PSA composition. With respect to the ratio of acrylamide to acrylic acid, such ratio broadly ranges from about 1:10 to about 10:1 by weight with about 1:2 being optimum for acrylamide to acrylic acid. This ratio is believed to be important in providing removability characteristics with retention of good initial tack and peel values.

Optionally, one or both of the emulsion copolymers or the IPN can contain styrene or other aromatic polymerizable monomer, vinyl chloride, vinylidene chloride, ethylene vinyl acetate, or other hydrophobic monomer. Styrene can be present in an amount up to about 25% by weight of both copolymers or IPN and preferably about 5% by weight styrene is included in the monomer mixture(s) that is subjected to emulsion copolymerization in accordance with the precepts of the present PSA composition.

If a blend of copolymers with separate acrylamide and unsaturated acid is used in formulating the novel adhesive composition, then at least one of the copolymers is made by emulsion polymerization techniques, while the other copolymer can be made by emulsion polymerization, solution polymerization, bulk polymerization, suspension polymerization, or other technique [see generally, D. H. Solomon, *The Chemistry of Organic Film Formers*, Robert E. Krieger Publishing Company, Huntington, N.Y. (1977)]. If an IPN is used in formulating the novel adhesive composition, the interpenetrating polymer network can be based either on the acrylamide-containing copolymer or on the unsaturated acid-containing copolymer, though synthesis again is by emulsion polymerization. Details on synthesis of interpenetrating polymer network emulsions can be found in U.S. Pat. No. 4,616,057, the disclosure of which is expressly incorporated herein by reference.

The emulsion copolymers or IPN can be made by a batch, semi-batch, or continuous process, though preferably a semi-batch process is employed. Despite the ability to meter a constant mixture of the monomers to the reaction vessel, the product emulsion copolymer blend evidences a two-stage morphology, as will be explored further below. Emulsion polymerization in the aqueous continuous phase is conducted in conventional fashion, such as described by D. H. Solomon in *The Chemistry of Organic Film Formers*, pp 294-303, supra. To this end, a conventional emulsifier, e.g., sodium alkylaryl polyethoxy sulfonate or the like, is utilized during the emulsion polymerization reaction. Conventional emulsion polymerization conditions are utilized, though higher non-volatile solids product content may optimize performance, e.g., about 50-65% non-volatile solids of the product emulsion copolymers. The reaction is continued until desirably virtually no acrylamide or other unreacted monomer remains. Any residual unreacted monomer should be removed at the end of the reaction in order that its presence does not degrade performance of the novel adhesive composition. Conventional free radical initiators are used, e.g. hydrogen peroxide, sodium persulfate, potassium persulfate, ammonium persulfate, and like peroxide and persulfate initiators. Conventional reducing agents (e.g. sodium metabisulfate or sodium formaldehyde sulfoxylate) are used as part of the redox initiator systems.

The copolymerization with acrylic acid preferably is run without a buffer at a pH of about 2-3 as determined by the decomposition of the persulfate catalyst (i.e., sulfonic acid generation). Since the pKa of acrylic acid is about 4, the pH of this emulsion reaction mixture should be very low, e.g. much less than 4, so that the acrylic acid copolymer does not ionize and thicken during the reaction. Once the reaction is complete, this copolymer can be basified (i.e., the pH raised with base above pH of reaction) to a pH of above 3, broadly 3-10, and preferably about 8-9. Basification provides a self-thickening adhesive composition and has been determined to enable manufacturing reproducibility of the adhesive composition. Use of an alkanol amine to neutralize the residual carboxyl functionality of the acrylic emulsion copolymer has been found to block the deleterious action of the hydrophobic defoamer while maintaining the adhesive through the hydroxyl activity. Suitable such alkanol amines include, for example, trimethanolamine, triethanolamine, tripropanolamine, trifluoroethanolamine, and diethanolamine, In making the emulsion copolymers or IPN, it is a distinct advantage that the emulsion copolymers or IPN need not contain any cross-linking monomers, N-methylol acrylamides, or zwitterionic monomers. These ingredients generally lower tack and initial peel values, thus reducing the strength and suitability of the adhesive contact, especially in high performance applications. Latent cross-linking functionality, additionally, can cause a loss of adhesive properties for aged unapplied films and labels and yellowing or discoloration of the adhesive. Thus, while such ingredients can be included in the emulsion copolymers or IPN in minor amount (e.g., not more than about 15 wt-%), they are not necessary and desirably are avoided.

The next ingredient utilized in formulating the novel adhesive composition is a surfactant (preferably a phosphate ester surfactant) that should be present in a proportion of about 0.01% to 10% by dry weight of the emulsion copolymers or IPN. The phosphate ester surfactant serves a dual function in the adhesive composition. One function is to promote the removability of a label or other substrate coated with a cured residue of the adhesive composition. The second function is the ability of the phosphate surfactant to wet-out silicone release sheets, which enhances coatability of the aqueous emulsion polymer on such release sheets. Too much phosphate, however, tends to promote foaming of the adhesive composition which detracts from its use in commercial settings. A good discussion of phosphate emulsifiers can be found in European patent application publication No. 287,306, cited above. Examples of these emulsifiers include, for example, ammonium, potassium or sodium salts of alkyl aryl polyethoxy phosphates, alkyl ethoxy phosphates, alkyl phosphates, alkyl polyethoxy phosphates, and the like, and even mixtures thereof. The phosphate coester structure augments the removability and other performance characteristics.

With respect to performance of the adhesive composition, advantageously, the adhesive is removable from a variety of substrates cleanly, i.e., no visible residue, including, for example, metals (e.g., stainless steel, aluminum, etc.) and plastics (e.g., polyethylene, polypropylene, polystyrene, polycarbonate, ABS resin, PVC resin, etc.) Build on aging generally is less than about 100% when the applied adhesive is maintained at about 70° C. for three weeks and less than about 50% when aged at room temperature for three weeks. A viscosity of about 1,000-10,000 centipoises is compatible with existing equipment and handling procedures, and preferably a viscosity of about 2,000-4,000 centipoises is maintained. Consistent with the theory expounded above is that testing has revealed that high surface energy polymeric film face stocks provide outstanding performance to the adhesive composition. Surface energy is the product obtained by multiplying surface tension by the two-thirds of the molecular weight and specific volume (e.g., see U.S. Pat. No. 4,529,563). Such face stocks include, for example, plasticized polyvinyl chloride and polyester films. Other film face stocks also are useful including, for example, cellulosics, metal foil, composites, and the like. In this regard, an emulsion copolymer based on 2-ethylhexyl acrylate has been determined to retain improved aged adhesive performance on plasticized vinyl facestock.

Conventional additives may be incorporated into the adhesive composition, including, for example, wetting agents, pigments, opacifying agents, anti-foam agents, and the like and mixtures thereof. The adhesives may be applied to one or both sides of the film face stock in a conventional manner, for example, by spraying, knife coating, roller coating, casting, drum coating, dipping, and the like. Indirect application using a transfer process with silicon release paper also can be used. After the adhesive has been applied, the coated film face stock is dried conventionally. The invention encompasses substrates coated with the dry residue of the PSAs.

The following examples show how the present PSA composition has been practiced, but should not be construed as limiting. In this application, all percentages and proportions are by weight and all units are in the metric system, unless otherwise expressly indicated. Also, all citations referred to herein are expressly incorporated herein by reference.

EXAMPLES

The emulsion polymerization procedure used to make the acrylic emulsion copolymers will be illustrated by the following detailed procedure. Material variances from this typical synthesis and the specific monomer mixtures will be detailed in the working example.

An emulsion polymer consisting of butyl acrylate (88%), styrene (10%) and acrylic acid (2%) was synthesized by employing conventional emulsion polymerization methods with a surfactant such as Triton X-200 emulsifier (sodium alkyl aryl polyethoxy sulfonate, 28 wt-% actives, Union Carbide Corporation, Danbury, Conn.). A 0.4 weight % (based on the latex resin) of a conventional defoamer (e.g., Rhodoline 646 manufactured by Rhodia Inc.) was added to the polymer. The emulsion polymer was reacted respectively with the different amines listed in Table 1, below.

TABLE 1

| Sample No. | Amine | Final pH |
|---|---|---|
| Comparative 1 | ammonium hydroxide | 8 |
| Comparative 2 | triethyl amine | 8 |
| Comparative 3 | Polyoxyalkylene amine | 8 |
| 4 | triethanol amine | 8 |
| 5 | diethanol amine | 8 |
| 6 | 2-amino-2-methyl propanol | 8 |

Procedure for Foam Density Measurement

A variable-speed mixer (Model N50, Hobart Canada, North York, Ontario) equipped with a whisk attachment and a metal mixing bowl was used. A 200 gram sample of the emulsion latex was placed in the mixing bowl and the whisk attachment was submerged in the latex. The latex was mixed at the medium speed (2 setting for a 3-speed Hobart mixer) for 5 minutes. After the whisk attachment was removed, the latex was poured into the pre-weighed metal cub to completely fill the covered container. The foam density was calculated by subtracting the weight of the empty cub from the latex filled cub and followed by dividing by 10. The high foam density number of the latex indicates the low foam generation.

The results of foam density test are displayed in Table 2, below.

TABLE 2

| Sample No. | Foam Density @ RT | Foam Density at 7 Days @ 50° C. |
|---|---|---|
| Comparative 1 | 6.2 | 1.9 |
| Comparative 2 | 7.0 | 3.0 |
| Comparative 3 | 6.8 | 2.9 |
| 4 | 8.1 | 8.1 |
| 5 | 7.9 | 6.2 |
| 6 | 7.5 | 4.0 |

The above-tabulated results demonstrate that foam density at room temperature at formulation of the PSA adhesive is about the same for all samples. Upon elevated temperature storage, however, comparative samples 1 and 2 show substantial loss of foam density. Inventive samples 4 and 5, however, exhibit the high foam density.

We claim:

1. An improved aqueous acrylic emulsion pressure sensitive adhesive composition (PSA) of diminished defoaming instability, consisting of i) an aqueous acrylic emulsion consisting of at least one $C_4$-$C_{18}$ alkyl (meth)acrylate monomer, at least one monomer having a residual carboxyl group, up to about 25% by weight styrene, and optionally an acrylamide or acrylamide derivative, and (ii) a sodium alkyl aryl polyethoxy sulfonate surfactant, said residual carboxyl group being neutralized with an alkanol amine selected from the group consisting of trimethanolamine, diethanolamine, triethanolamine, tripropanolamine and trifluoroethanolamine.

2. The improved PSA of claim 1, wherein said $C_4$-$C_{18}$ alkyl (meth)acrylate monomer is butyl acrylate.

3. The improved PSA of claim 1, wherein said acrylamide or acrylamide derivative is one or more of acrylamide, diacetone acrylamide, N,N'-dimethacrylamide, N,N'-diethylmethacrylamide, n-tert-octylacrylamide, N-iso-propylacrylamide, N-(n-octyldecyl)acrylamide, N-benzylmethacrylamide; methacrylamide, N,N'-dimethylmethacrylamide, N,N'-diphenyl methacrylamide, N-n-dodecylmethacrylamide, or N-ethylmethacrylamide, N-[3-(N,N'-Dimethylamino)-propyl]acrylamide, N-[2-N,N'-dimethylaminoethyl]methacrylamide N[3-(N,N-dimethylamino)-propyl]methacrylamide, N,N'-cystaminebisacrylamide, N,N'-ethylenebisacrylamide, N,N'-hexamethylenebisacrylamide, N,N'-methylenebisacrylamide hydroxymethydiacetoneacrylamide, N,N'-diallylacrylamide, N-methylolacrylamide, N-(phthalimidomethyl)acrylamide, N-(2-hydroxypropyl) methacrylamide, or N-(iso-butoxymethyl)methacrylamide.

4. The improved PSA of claim 1, wherein said residual carboxyl group is derived from one or more of acrylic acid, a butenoic acid, a fumaric acid, or an ethylenically unsaturated dicarboxylic acids.

5. The improved PSA of claim 4, wherein said acid is one or more of ($C_1$-$C_4$ alkyl)acrylic acid, crotonic acid, isocrotonic acid, vinyl acetic acid, fumaric acid, maleic acid, glutaconic acid, allyl malonic acid, allyl succinic acid, or itaconic acid.

6. A substrate coated with the dry residue of the PSA of claim 1.

7. A substrate coated with the dry residue of the PSA of claim 5.

8. An improved aqueous acrylic emulsion pressure sensitive adhesive composition (PSA) of diminished defoaming instability, the improvement which comprises: an aqueous acrylic emulsion formulated from about 88% butyl acrylate, at least one monomer having a residual carboxyl group and further comprising a sulfonate ester surfactant and about 10% styrene, said residual carboxyl group being neutralized with an alkanol amine.

9. The improved PSA of claim 8, wherein said aqueous acrylic emulsion is formulated from an acrylamide or acrylamide derivative.

10. The improved PSA of claim 8, wherein said alkanol amine is one or more of trimethanolamine, triethanolamine, tripropanolamine, trifluoroethanolamine, or diethanolamine.

11. A substrate coated with the dry residue of the PSA of claim 8.

* * * * *